United States Patent
Gordon

(10) Patent No.: US 9,911,329 B1
(45) Date of Patent: Mar. 6, 2018

(54) ENHANCED TRAFFIC SIGN INFORMATION MESSAGING SYSTEM

(71) Applicant: Robert Gordon, Plainview, NY (US)

(72) Inventor: Robert Gordon, Plainview, NY (US)

( * ) Notice: Subject to any disclaimer, the term of this patent is extended or adjusted under 35 U.S.C. 154(b) by 0 days.

(21) Appl. No.: 15/660,789

(22) Filed: Jul. 26, 2017

Related U.S. Application Data

(60) Provisional application No. 62/462,451, filed on Feb. 23, 2017.

(51) Int. Cl.
*G08G 1/09* (2006.01)
*G08G 1/0967* (2006.01)
*H04L 29/08* (2006.01)

(52) U.S. Cl.
CPC ....... *G08G 1/096775* (2013.01); *H04L 67/12* (2013.01)

(58) Field of Classification Search
CPC .. G08G 1/0967; G08G 1/09; G08G 1/096783; G08G 1/096741
USPC .............. 340/905, 990, 991, 995.13, 995.12; 701/117–119
See application file for complete search history.

(56) References Cited

U.S. PATENT DOCUMENTS

| | | | |
|---|---|---|---|
| 5,420,794 A | 5/1995 | James | |
| 5,504,482 A | 4/1996 | Schreder | |
| 5,689,252 A | 11/1997 | Ayanoglu et al. | |
| 5,875,412 A | 2/1999 | Sulich et al. | |
| 6,141,710 A | 10/2000 | Miesterfeld | |
| 6,298,302 B2 | 10/2001 | Walgers et al. | |
| 6,314,360 B1 | 11/2001 | Becker | |
| 6,700,505 B2 | 3/2004 | Yamashita et al. | |
| 6,853,915 B2 | 2/2005 | Hubschneider et al. | |
| 6,868,331 B2 | 3/2005 | Hanebrink | |
| 6,873,908 B2 | 3/2005 | Petzold et al. | |
| 6,990,407 B1 * | 1/2006 | Mbekeani | G08G 1/0104 340/995.13 |
| 7,317,973 B2 | 1/2008 | Dieterle | |
| 7,421,334 B2 | 9/2008 | Dahlgren et al. | |
| 7,471,212 B2 | 12/2008 | Krautter et al. | |
| 7,483,786 B1 | 1/2009 | Sidoti et al. | |
| 7,590,489 B2 | 9/2009 | Auger et al. | |
| 7,593,813 B2 | 9/2009 | Hahlweg et al. | |
| 7,725,250 B2 | 5/2010 | Bisdikian et al. | |

(Continued)

OTHER PUBLICATIONS

Hyungjun Park, Simona Babiceanu, Robert Kluger, Brian Smith, and David Recht, "A Connected Vehicle-Enabled Virtual Dynamic message Sign System Demonstration and Evaluation on the Virginia Connected Vehicle Test Bed", Mar. 15, 2016.

(Continued)

*Primary Examiner* — Toan N Pham
(74) *Attorney, Agent, or Firm* — Law Offices of Leo Mikityanskiy, P.C.; Leonid Mikityanskiy

(57) ABSTRACT

An Enhanced Traffic Sign Information Messaging System (ETSIMS) that provides the methodology, functions and support equipment to provide vehicles, which might not be within sight of the traffic message sign, with all or some prioritized parts of the message displayed on the sign, or an enhanced version of the information provided on the sign, including traffic information messages inferred from the message displayed on the traffic message sign. ETSIMS may also provide messages of this type without the need for the physical presence of a sign on the roadway.

18 Claims, 6 Drawing Sheets

(56) References Cited

U.S. PATENT DOCUMENTS

| | | |
|---|---|---|
| 7,930,095 B2 | 4/2011 | Lee |
| 7,974,772 B2 | 7/2011 | Nitz et al. |
| 8,099,236 B2 | 1/2012 | Olson et al. |
| 8,103,435 B2 | 1/2012 | Yang et al. |
| 8,155,865 B2 | 4/2012 | Bicego, Jr. |
| 8,234,064 B2 | 7/2012 | Oonishi |
| 8,311,727 B2 | 11/2012 | Eckstein et al. |
| 8,326,474 B2 | 12/2012 | Schrey et al. |
| 8,332,132 B2 | 12/2012 | Groenhuijzen et al. |
| 8,346,430 B2 | 1/2013 | Przymusinski et al. |
| 8,493,198 B1 * | 7/2013 | Vasquez .............. B60Q 9/008 340/425.5 |
| 8,706,417 B2 | 4/2014 | Zeng et al. |
| 9,053,636 B2 | 6/2015 | Gordon |
| 9,208,682 B2 | 12/2015 | Fowe et al. |
| 9,211,891 B2 | 12/2015 | Scofield et al. |
| 9,257,041 B2 | 2/2016 | Scofield et al. |
| 9,286,800 B2 | 3/2016 | Gordon |
| 9,299,251 B2 | 3/2016 | Scofield et al. |
| 9,552,726 B2 * | 1/2017 | McGrath ............ G08G 1/09675 |
| 2004/0246147 A1 | 12/2004 | von Grabe |
| 2004/0249562 A1 | 12/2004 | Tsuge et al. |
| 2005/0131627 A1 | 6/2005 | Ignatin |
| 2005/0192033 A1 | 9/2005 | Videtich |
| 2006/0069496 A1 | 3/2006 | Feldman et al. |
| 2006/0247844 A1 | 11/2006 | Wang et al. |
| 2007/0208492 A1 | 9/2007 | Downs et al. |
| 2009/0287401 A1 | 11/2009 | Levine et al. |
| 2010/0256898 A1 | 10/2010 | Gassner |
| 2012/0083995 A1 | 4/2012 | Vorona |

OTHER PUBLICATIONS

Robert Gordon, "Intelligent Transportation Systems—Second Edition", Springer, ISBN 978-3-319-14767-3, 2016 (Book—relevant page submitted).

Transportation Research Board, Washington, D.C., Highway Capacity Manual, Dec. 2010, Ch. 11/Basic Freeway Segments, p. 11-8, Exhibit 11-6 LOS for Basic Freeway Segments (Book—relevant page submitted).

Charles Levecq, Beverly Kuhn, and Debbie Jasek, "General Guidelines for Active Traffic Management Deployment", Texas Transportation Institute, Oct. 2011.

Sania Irwin, "Connected Car", Nokia Solutions and Networks, May 27, 2015.

Department of Transportation, National Highway Traffic Safety Administration, "Visual-Manual NHTSA Driver Distraction Guidelines for Portable and Aftermarket Devices", Notice of Proposed Federal Guidelines, Federal Register vol. 81, No. 233, 87656, Dec. 5, 2016.

* cited by examiner

|  | MINUTES TO |  |
|---|---|---|
| US35 | 12MI | 15 |
| I675 | 22MI | 24 |

FIG. 4

Traffic Alerts

| Time Entered | County | Roadway | Lanes Closed | Direction | Incident |
|---|---|---|---|---|---|
| 8:48:00 AM | Nassau | Northern State Pkwy. | Left Lane | Eastbound | Accident 2 Vehicles |

Brief Description : Northern State Parkway E/B Accident between Exit 31A (Meadowbrook State Parkway) to Exit 32 (Post Ave.) in Nassau County, the left lane is blocked.   29781

| Time Entered | County | Roadway | Lanes Closed | Direction | Incident |
|---|---|---|---|---|---|
| 8:46:00 AM | Nassau | Wantagh State Pkwy | Right Lane | Northbound | Accident 2 Vehicles |

Brief Description : Wantagh State Parkway N/B Accident between Exit W3 (Hempstead Turnpike) to Exit W2 (Old Country Road) in Nassau County, the right lane is blocked. *Resolved: 9:15:00 AM*   29780

FIG. 5

Daily Road Work

The following is a listing of all of the Daily Road Work events for today and tomorrow.

Today (1/11/2017) | Tomorrow (1/12/2017)

Daily Road Work Listings For Today (1/11/2017)

| Roadway | Direction | Lanes Closed | Time(Begin/End) |
|---|---|---|---|
| Southern State Pkwy. | Westbound | Right Lane | 10:30:00 AM / 12:00:00 PM |
| | Description: Exit 43 (NY 111) to Exit 41A (Sagtikos State Parkway), Pothole Repair. | | |
| NY 347 | East/West | One Lane | 7:00:00 AM / 3:00:00 PM |
| | Description: Mount Pleasant Road to Southern Blvd. in Smithtown. | | |
| NY 347 | East/West | One Lane | 7:00:00 AM / 3:00:00 PM |
| | Description: Gibbs Pond Road to Terry Road in Smithtown. | | |
| NY 109 | Eastbound | One Lane | 10:00:00 AM / 3:00:00 PM |
| | Description: Morton Street to NY 110 in Farmingdale. | | |
| NY 110 | North/South | One Lane | 10:00:00 AM / 3:00:00 PM |
| | Description: Dixon Ave. to South Drive. | | |
| NY 27 (Sunrise Hwy.) | Westbound | One Lane | 9:00:00 AM / 3:00:00 PM |
| | Description: At the Meadowbrook State Parkway. | | |
| NY 27 (Sunrise Hwy.) | East/West | One Lane | 10:00:00 AM / 3:00:00 PM |
| | Description: County Line Road to Great Neck Road in Amityville. | | |

FIG. 6

ENHANCED TRAFFIC SIGN INFORMATION MESSAGING SYSTEM

CROSS REFERENCE OF RELATED APPLICATIONS

This patent application is a nonprovisional patent application of and claims priority from the provisional patent application Ser. No. 62/462,451 filed on Feb. 23, 2017, which is hereby incorporated by reference in its entirety.

FIELD OF THE INVENTION

This invention was not made pursuant to any federally-sponsored research and/or development.

The present invention develops methods and systems for an Enhanced Traffic Sign Information Messaging System (ETSIMS). ETSIMS includes the methods, functions and support equipment to provide vehicles that are not within visible range of a motorist message sign with an enhanced version of the information provided on the sign. The visible range of any message sign is very limited, and the sign is only viewable from the approach. This limits the usefulness of the sign and the message it displays unless there is a way to relate the message to the motorist. ETSIMS may also provide messages of this type without the need for the physical presence of a sign anywhere on the roadway.

BACKGROUND

Prior work on the extension of DMS (dynamic message signs) to display the messages in connected vehicles may be summarized by an examination of a project described by Park et al ("the Park project").[1] That project resulted in the in-vehicle visual and audible display of messages on DMS on a portion of a freeway. The system operator can enhance these messages or provide his own messages to the display in the vehicle. The project used roadside equipment (RSE) to communicate to the vehicle at certain locations on the freeway. Limited testing using smartphones was also performed.

[1] Park, H., Babiceanu, S, Kluger, R, Smith, B., and D. Recht, "A Connected Vehicle-Enabled Virtual Dynamic message Sign System Demonstration and Evaluation on the Virginia Connected Vehicle Test Bed", Mar. 15, 2016.

The current patent application overcomes the following limitations of that project:

The prior system's software can only be used in connection with DMS on a freeway. The limited capability of the data structures employed do not support its use for signs for vehicles on arterials (ADMS) or for use with messages that are oriented to corridors (a roadway network that contains portions of the freeway system as well as surface street arterials)[2] and whose traffic management is coordinated by transportation management centers (TMCs). These limitations restrict the numbers of motorists with access to the information to those that are already on the freeway and are close to the DMS.

The prior system is labor intensive with regard to its ability to provide in-vehicle messages beyond the text on the DMS (enhanced messages). Labor saving by automated generation of additional messages will facilitate wide-area deployment.

The prior system does not prioritize additional messages that may be added for a DMS location. Prioritization and message size limiting may be required for safety reasons and to provide compatibility with the message display techniques available in the vehicle.

The prior system does not consider the type of message that the motorist prefers. For example, while travel time messages are currently often provided on DMS/ADMS, the motorist may prefer messages indicating:

A summary of level of congestion with locations

Whether the congestion is "normal" or "unusual" for this time period.

[2] R. Gordon, "Intelligent Transportation Systems—Second Edition", Springer, ISBN 978-3-319-14767-3, 2016.

ETSIMS automatically generates messages of this type from travel time messages. The message format actually displayed may be selected by the motorist or automated vehicle.

The prior system has no capability for automatic structured search of databases that may lead to additional messages. For example, an unusually long travel time as reported on a DMS may have its cause in a weather related event (e.g. flooding). While a TMC operator may or may not recognize this connection, (if he is, in fact, actually aware of the event), ETSIMS' automatic data base search using keywords will likely identify this connection and provide an additional automated message.

SUMMARY OF THE INVENTION

Dynamic message signs are commonly used to advise motorists on limited access highways and on surface streets of traffic conditions downstream of the signs. Following the Pennsylvania Department of Transportation's nomenclature, we use "dynamic message signs" (DMS) as the term for signs on limited access highways (freeways) and term those on surface streets as "arterial dynamic message signs" (ADMS).

With increasing emphasis on connected vehicles, transportation management centers are expressing increasing interest in extending and enhancing the type of traffic information provided by DMS and ADMS to those vehicles. This patent application describes an Enhanced Traffic Sign Information Messaging System (ETSIMS) that provides the functions and support equipment to provide vehicles that might not be within sight of the sign with an enhanced version of the information provided on the sign. It may also provide messages of this type without the need for the physical presence of a sign.

BRIEF DESCRIPTION OF THE DRAWINGS

The features, aspects and advantages of the novel Prediction for Lane Guidance Assist will become further understood with reference to the following description and accompanying drawings where

FIG. 4 depicts an example of travel time messages on DMS;

FIG. 5 illustrates a portion of an incident database; and

FIG. 6 provides an example of a portion of a construction database.

DESCRIPTION

Introduction.

The ETSIMS patent application overcomes the limitations of the Park project by inclusion of the following:

Providing a process that receives DMS and ADMS messages from traffic management centers (TMCs), interprets them and provides these and related messages to drivers and automated vehicles that are not within sight of the DMS or ADMS.

Providing a geographical data structure that relates the DMS or ADMS to the vehicle's current location and direction to the area which the sign will manage. The data structure includes a vehicle catchment domain and an application domain associated with each DMS and ADMS.

Classifying most messages provided on DMS and ADMS into general message types. The message types may be used to automatically generate appropriate enhanced messages for each application domain based on the DMS or ADMS message as well as additional information provided by the traffic management center's databases, and provide these enhanced messages for the operator's review prior to transmission to the vehicle.

Providing a priority for each message to enable the limitation of the number of messages to a level that is consistent with safety display requirements that limit driver distraction.

Communicating the enhanced message sets to suitably equipped vehicles.

Displaying those portions of the message sets that are appropriate for the vehicle's location, direction and display constraints including display safety criteria and the physical constraints of the display devices.

Providing in-vehicle motorist information for active traffic management (ATM) control devices.

The ETSIMS contains a management center (ETSIMSMC) which receives information from a state traffic management center (TMC) and/or other information sources, and which develops messages to be sent to the vehicle's portion of the system (ETSIMSVM) through an appropriate communication system.

Since latency is not a critical issue, cellular communications employing 4G LTE technology may be used for communication. Alternatively, satellite communications or infrastructure to vehicle DSRC communications may be used, as well as any suitable high- or low-speed communication method.

The following discussion elaborates on ETSIMS functions and processes and provides examples.

1. ETSIMSMC Management Center Processes

Geometric Domain Process.

Figure 1:
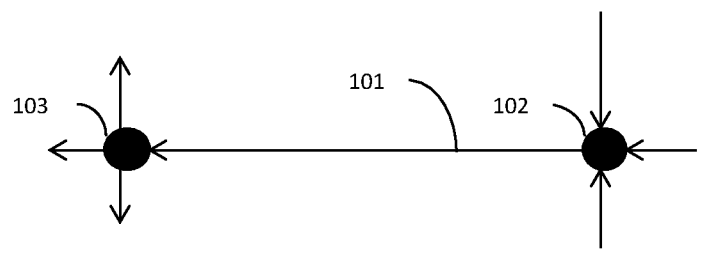
FIG. 1 illustrates the definition of links.

As in many other applications, as illustrated in FIG. 1, a link 101 is a unidirectional roadway segment between two nodes 102, 103 that accepts or implements turning movements at the nodes. A directionality is associated with links so that vehicles may identify their presence on a link.

ETSIMS associates at least two domains with each DMS and ADMS. These domains are:

Catchment domain—This includes the portions of the highway network for which connected vehicles are located and which might benefit from the message displayed on a DMS or ADMS. The catchment domain often includes links on roadways that generally lie upstream of the upstream node on the link on which the DMS or ADMS is placed or orthogonal to the link on which the DMS or ADMS is placed. Origin-destination models and traffic signal sectioning plans may be used to assist in the establishment of catchment domain boundaries. An example of a catchment domain 203 is shown in FIG. 2.

Management domain—This includes the portion of the roadway network that is the subject of the messages displayed on the DMS and ADMS. An example 204 is shown in FIG. 2. In addition to its freeway portions, this network is usually defined as links on the arterials to which traffic is usually assigned by transportation planners. Low capacity streets and those that are primarily residential are usually avoided. The management domain generally lies downstream of or orthogonal to the downstream node of the link containing the DMS or ADMS. Review of the locations and links displayed on the messages for a DMS/ADMS may assist in establishing management domain boundaries. While management domains reflect the most likely DMS/ADMS message scenarios, DMS and ADMS will often carry messages affecting more than one management domain.

Figure 2:
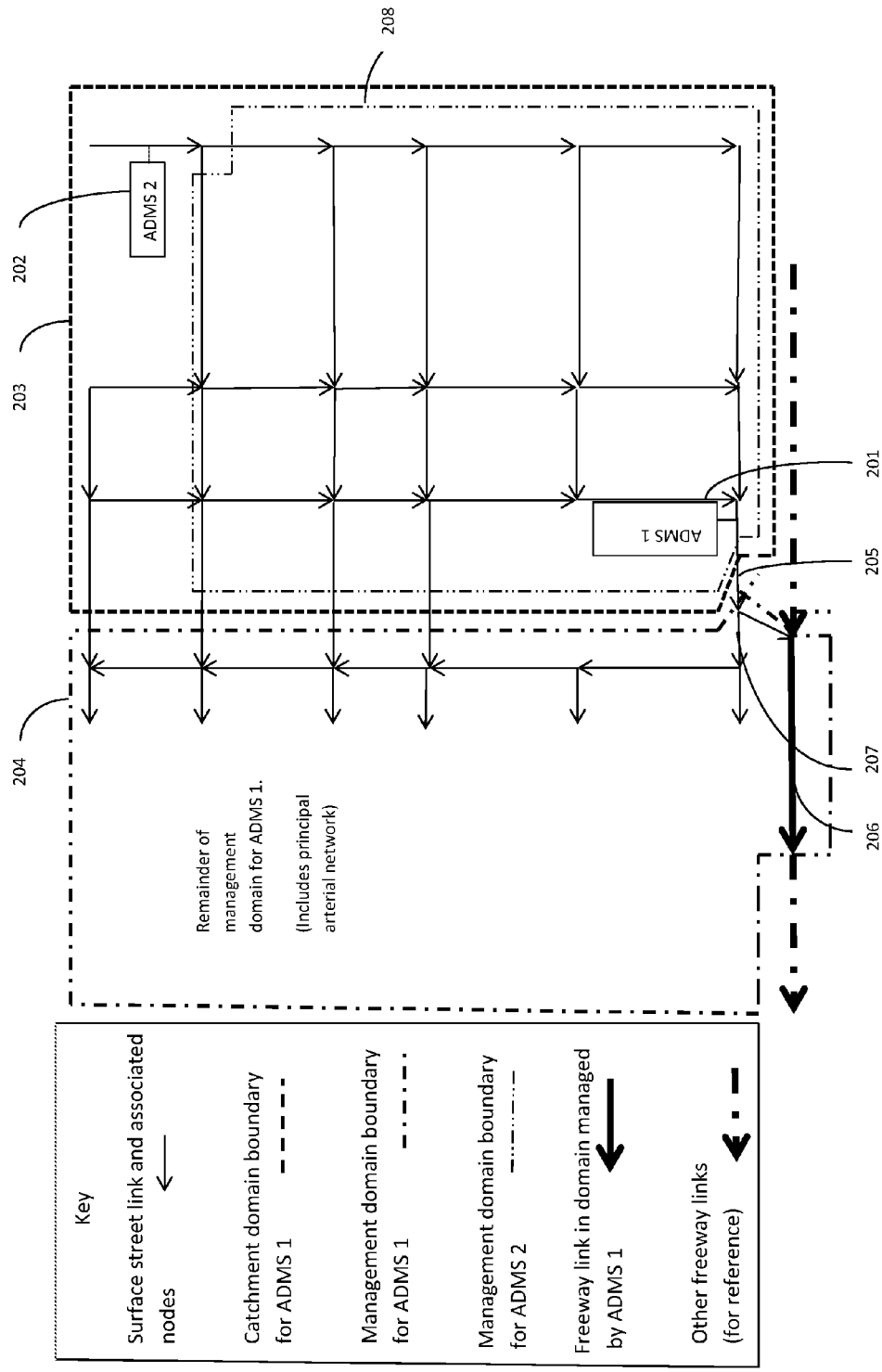
FIG. 2 shows the configuration of domains for ADMS as employed in the invention.

FIG. 2 shows ADMS 1 201 located on a frontage road surface street arterial near freeway entry ramps. Its principal function is to assist in management of the corridor consisting of the freeway and major parallel arterials and their connectors. The catchment domain 203 for ADMS 1 201 consists of the appropriate links on the portion of the surface street network that lies upstream of and orthogonal to ADMS 1 201. The management domain 204 for ADMS 1 201 consists of a portion of the surface street network that lies downstream and orthogonal to the downstream node of the link containing ADMS 1 201 and the freeway section shown comprising several interchanges. A link on the frontage road 205 leads to the decision to use the freeway 206 or to remain on the surface street arterial 207. A second ADMS 202 on another arterial is intended for surface street arterial traffic management as well as freeways for which the domain's traffic may be destined. The management domain for ADMS 2 is shown 208.

Figure 3:
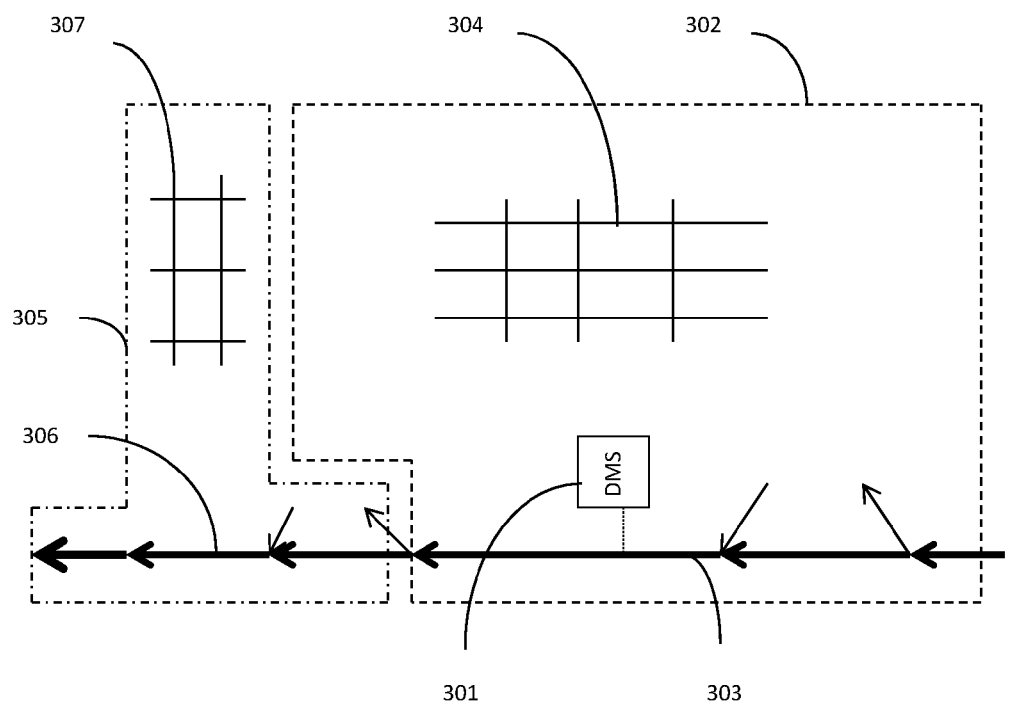
FIG. 3 shows the configuration of domains for DMS as employed in the invention.
Figure 3:
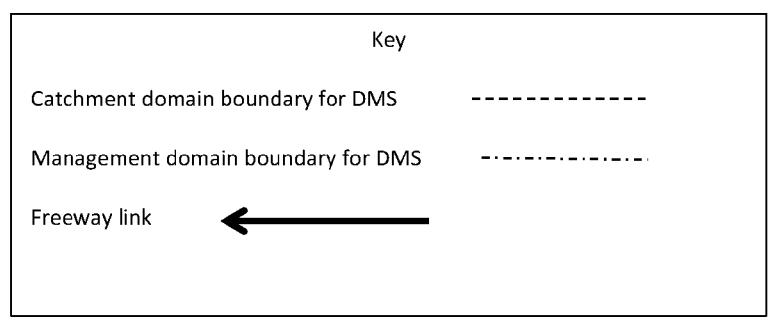

FIG. 3 shows a DMS 301 on a freeway. The catchment domain 302 includes both the freeway 303 and portions of the of the surface street network 304 on which motorists might benefit from the enhanced DMS message. In this way the display in the vehicle can provide messages to motorists on the surface streets 304 in the catchment area that might benefit from the message. The management domain 305 also includes a freeway portion 306 and a surface street component 307.

Inferred Message Generation Process.

In addition to the display of the original messages, ETSIMS provides an inferred message generation process. Table 1 is an example of the relationship between components of the DMS or ADMS message and the general category of events for which messages are developed. ETSIMS analyzes the message text for message components and classifies them into categories. The message text is analyzed by comparing the text with a pre-selected listing of message keywords. Table 2 provides an example of keywords that facilitate identification of message components. The checks in Table 1 are then used to relate the pertinent message components to event categories. Additional inferred messages may now be generated using databases in the TMC and elsewhere that are associated with these event categories. The computer automated steps in this process are described below.

TABLE 1

Example of Inference Relationships Checklist

| Original Message Component (M) | Event Categories (E) | | | | | | | |
|---|---|---|---|---|---|---|---|---|
| | 1 Delay | 2 Incident | 3 Construction | 4 Weather type | 5 Other emergency | 6 Special event | 7 Active traffic management operations | Routine default message |
| 1 Location or congestion range affected | ✓ | ✓ | ✓ | ✓ | ✓ | ✓ | ✓ | |
| 2 Nature of event or incident (crash, stall, fire, debris) | | ✓ | ✓ | | ✓ | | | |
| 3 Lanes affected | | ✓ | ✓ | ✓ | ✓ | ✓ | | |
| 4 Automatic travel time message (minutes) | ✓ | ✓ | ✓ | ✓ | ✓ | ✓ | | |
| 5 Quantification of delay (minutes) | ✓ | ✓ | ✓ | ✓ | ✓ | ✓ | | |
| 6 Delay description e.g. minor, major, unusual | ✓ | ✓ | ✓ | ✓ | ✓ | | | |
| 7 Alternate routing info or diversion recommendation | ✓ | ✓ | ✓ | ✓ | ✓ | ✓ | | |
| 8 Weather (snow, ice. rain, fog, high water, sun) | ✓ | | | ✓ | | | | |
| 9 Parking and transit info | ✓ | ✓ | ✓ | | ✓ | ✓ | | |
| 10 Lane restriction | | ✓ | ✓ | ✓ | ✓ | ✓ | ✓ | |
| 11 Route restriction | | ✓ | ✓ | ✓ | ✓ | | | |
| 12 Speed restriction | ✓ | ✓ | ✓ | ✓ | ✓ | | ✓ | |
| 13 Shoulder use | | | | | | | ✓ | |
| 14 Toll Changes | | | | | | | ✓ | |

✓identifies relevant databases to be searched for additional message components

TABLE 2

Keywords

| Original Message Component (M) | Key Words |
|---|---|
| 1 Location or congestion range affected | Exit, avenue, ave, street, st, road, rd, lane, US, I, mi, miles, ahead, to |
| 2 Nature of event or incident (crash, stall, fire, debris) | Crash, accident, stall(ed), fire, debris, construction, work zone, bridge, event, (local special events) |
| 3 Lanes affected | Lane(s), closed, left, right, center |
| 4 Automatic travel time message (minutes) | Miles, minutes |
| 5 Quantification of delay (minutes) | Minutes, delay |
| 6 Delay description | minor, major, unusual |
| 7 Alternate routing info or diversion recommendation | Use, next, off ramp, offramp, alt, alternate, on, via |
| 8 Weather | snow, ice, icy, rain, fog, high water, sun |
| 9 Parking and transit info | Parking, spaces |
| 10 Lane restriction | Use, lane, closed, detour |
| 11 Route restriction | Use, closed |
| 12 Speed restriction | MPH, speed, lights, reduce |
| 13 Shoulder use | Shoulder, use, not, no |
| 14 Toll Changes | Toll |

Inferred messages for each DMS/ADMS message will be generated using following steps and the assistance of the relationships in Table 1.

a. Identify message components from DMS/ADMS message. Use key words in message to identify the components (e.g. "travel time", "delay", or "accident"). Table 2 provides examples of keywords as related to the message components in Table 1.

b. Identify links for which message applies. Use keywords in the message and a link identifier table. Identify management domains in which applicable links are located. Identify catchment domain associated with the management domain.

c. Using Table 1, identify event categories for applicable message components.

d. For each event category search and analyze the databases for the additional message components generated by Table 1 for these categories for the applicable links. The databases to be searched may include:

Link speed—From traffic management center (TMC) or traffic data service provider. Compare speed with pre-defined criteria to identify delay (Event Category 1).

Figure 4:
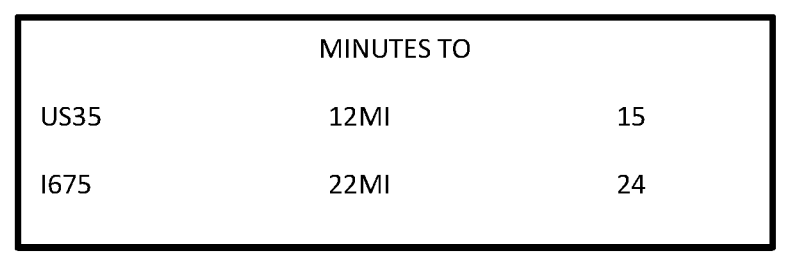

Link travel time—From traffic management center (TMC) or traffic data service provider. Compare travel time with pre-defined criteria to identify delay (Event Category 1). FIG. 4 is an example of travel time messages provided by the Ohio Department of Transportation.

Incident—From traffic management center (TMC), police database, 911 database or traffic data service provider (Event Category 2). FIG. 5 is an example of a portion of an incident database provided by the New York State Department of Transportation.

Construction—From construction division of highway department or from traffic management center (Event Category 3). FIG. 6 is an example of a portion of a construction database provided by the New York State Department of Transportation.

Weather—From road weather information system (RWIS) or from traffic management center (Event Category 4).

Other Emergency—From police database or 911 database (Event Category 5).

Special events—From traffic management center (TMC), municipal calendar or traffic data service provider (Event Category 6).

The database search will reveal information corresponding to the message components in Table 1. For example, a simple travel time DMS message "EXIT 20-10 MI 30 MINUTES" might be analyzed as follows:

a. Determine speed (20 MPH) from distance and travel time.

b. Compare with speed limit and assign a congestion level. The Highway Capacity Manual[3] Level of Service (congestion) classification scheme is an example of how this might be done.
c. Compare speed or travel time with historic value to see if congestion is usual (recurrent) or unusual (non-recurrent).
d. If congestion is non-recurrent, search the databases associated with the checks in the Delay category of events in Table 1. These include the databases associated with event categories 2, 3, 4, 5 and 6.
e. Generate inferred enhanced messages describing the properties resulting from the classification process. An example of an inferred message set from which the appropriate message might be selected includes:
No delay
Minor delay
Usual delay
Significant unusual delay
Major unusual delay

[3]HCM 2010 Highway Capacity Manual, Transportation Research Board, Washington, D.C.

Tag each inferred message with the appropriate management domain, links and message component class.

Active Traffic Management (ATM) Message Development Process.

Active traffic management[4] consists of a coordinated set of strategies that intensively manage traffic on a section of freeway. The individual strategies may consist of restrictions on lane use and speed, and changes in lane use markings, shoulder use and changes in toll lane use and toll charges. They are often controlled by traffic information devices spaced at relatively short intervals. These devices include DMS, variable speed limit signs (possibly over each lane), lane control signals and changeable roadway lane delineation markings. These devices are often located at relatively short intervals on the roadway and are often managed by a separate software module in the TMC that coordinates these management strategies.

[4] Levecq, C., Kuhn, B., Jasek, D., "General Guidelines for Active Traffic Management Deployment", Texas Transportation Institute, 2011.

ETSIMS accommodates ATM in the following ways:
The ETSIMS link structure previously described will provide a link for each section of roadway that lies between ATM motorist information devices.
Information to the ATM related roadway equipment (for example, Table 1, message component items 10, 12, 13 and 14) will be monitored by ETSIMS.

Priority Assignment Process.

For safety reasons and to facilitate message presentation in the vehicle, messages displayed in the vehicle by visual or audio means will be limited in size so that the display is safe and non-distractive to the motorist. This size limitation is facilitated by the operator mode section process (subsequently described), by the physical constraints of the display, by the appropriate catchment domain, and by the priority assignment process. The priority assignment process described below identifies the priorities to be used by the vehicle for this purpose.

Attach a priority to each inferred message. Message priorities normally depend on the severity of the event's impact and (except for area-wide messages) on the proximity to the vehicle. Since ETSIMS will display messages affecting the catchment and management domains, safety and impact severity will determine the priority. Message components 1, 2 and 3 in Table 1 will be included in each message. An example of a priority structure is shown in Table 3.

TABLE 3

Priority Structure

| Priority | Message Component (Table 1) |
| --- | --- |
| 1 | 8, 10, 11, 12, 13 |
| 2 | 7, 14 and severe or unusual delays for 4, 5, 6 |
| 3 | 9 and moderate delays for 4, 5, 6 |
| 4 | Minor or no delay for 4, 5, 6 |

Operator Mode Selection Process.
The ETSIMS operator may manage the system in the following ways.
a. Allow the ETSIMS functions to proceed automatically.
b. Provide the opportunity for the ETSIMS operator to review and accept, reject or modify the messages developed automatically by the process described above.

Pseudosign Process.

Connected vehicle technology provides the opportunity to communicate the type of information normally displayed by DMS or ADMS at those locations for which no physical sign is present. This facilitates communication of additional information that may be present at the traffic management center (TMC). Thus the TMC or ETSIMS operator is optionally provided with the capability to identify the location of and provide a message for a pseudo DMS or ADMS which, if actually present, might be useful. This pseudosign requires the same type of domain structure as do real DMS and ADMS. The inferred message generation process described above may be used to develop the pseudosign messages. Using this process, those ETSIMS managed by the TMC may be used to implement more specifically targeted traffic management strategies.

2. Communication to Vehicle

The processes described above will result in the generation of a message set for each management domain. These message sets will be transmitted to vehicles suitably equipped to receive them. Transmission may be made by conventional wireless techniques such as cellular telephone or satellite communication. Transmission rates of approximately one complete set of messages per second are acceptable. Communication may also employ the roadside units (RSUs) and on board units (OBUs)[5] that conform to USDOT requirements. A message set typically includes the following:

[5] Irwin, S., Connected Car, Nokia, 2015.

Message subsets for each management domain containing:
Locations or location range pertinent to the message
Delay descriptors
Where message components 2 and/or 8 in Table 1 are involved, the following may also be included in the message set:
Problem or issue (e.g. event cause, lane condition if appropriate, emergency equipment if appropriate)
Mandatory requirement (e.g. detour, speed reduction, lane use restriction)
Option or alternative (e.g. alternate route)
3. Vehicle Based Processes (ETSIMSVM)
These processes basically receive information from the ETSIMSMC and adapt it for message presentation in the vehicle. While the preferred location for the computation of these processes is in the vehicle, it may alternatively be located in the cloud. Communication between the cloud and the vehicle may use a technique described earlier.

Catchment Domain Filter Process.

This process filters received message sets for a management domain. The vehicle based processes will apply to those received messages that relate to the catchment domain in which the vehicle is currently located. Thus the catchment domain filter rejects those messages that do not correspond to the catchment domain in which the vehicle is currently located. The vehicle must also be currently located on a link in the catchment domain whose direction is consistent with the vehicle's current direction. The vehicle may be in the catchment domain of more than one DMS or ADMS.

Style Filter Process.

Some messages may contain the same basic information as others but present it in a different way. For example, message component classes 4, 5 and 6 (Table 1) may often present essentially the same information in different ways. By entering style preferences into ETSIMSVM, motorists may elect to receive messages in the style they favor, thus further reducing the motorist message set.

Priority Filter Process.

Message presentation considerations should conform to safety guidelines concerning distracted driving. For example, for visual presentation, NHTSA guidelines[6] propose that individual glances away from the roadway by the motorist be limited to two seconds with a cumulative time limit of 12 seconds. The residual messages displayed by text or graphics will be limited by this process to these guidelines by means of the priority structure described earlier.

[6] Visual-Manual NHTSA Driver Distraction Guidelines for Portable and Aftermarket Devices, Notice of Proposed Federal Guidelines, Federal Register Vol 81, No 233, Dec. 5, 2016.

What is claimed is:

1. A method for providing traffic information messages, comprising:
   a. receiving at an ETSIMS management center at a physical location or in a cloud a plurality of messages displayed on a DMS or an ADMS, said plurality of messages originating from a traffic management center (TMC), a regional traffic information management center or a traffic information service;
   b. associating a first at least one catchment domain including one or more parts of a roadway network and a management domain including one or more parts of the roadway network containing the physical location of the DMS or the ADMS;
   c. prioritizing messages from the plurality of messages to be provided to vehicles; and
   d. communicating the prioritized messages to the vehicles.

2. The method of claim 1, further comprising identifying message components of each of the plurality of messages after receiving the plurality of messages and communicating the message components to the vehicles.

3. The method of claim 2, wherein the step of identifying the message components is performed using keywords or other artificial intelligence techniques.

4. The method of claim 3, further comprising:
   a. identifying the keywords present in each message;
   b. identifying roadway links for which the message applies using the keywords present in the message and a link identifier table;
   c. identifying a management domain in which the links are located;
   d. identifying a second at least one catchment domain associated with the management domain;
   e. determining applicable informational messages originating on the sign; and
   f. transmitting the applicable informational messages to vehicles located in the second at least one catchment domain.

5. The method of claim 4, further comprising tagging each of the plurality of messages with the corresponding management domain, the second at least one catchment domain, and message components.

6. The method of claim 1, wherein the physical location of the DMS or the ADMS is not within sight of drivers or automated vehicles.

7. The method of claim 1, wherein the physical location of the DMS or the ADMS is within sight of drivers or automated vehicles.

8. The method of claim 1, further comprising providing a geographical data structure that correlates the DMS or the ADMS to the management domain and to the first at least one catchment domain.

9. A method for providing inferred traffic information messages, comprising:
   a. receiving a message displayed on a real or virtual DMS or a real or virtual ADMS at a management center from a traffic management center (TMC), a regional traffic information center or a traffic information service;
   b. associating a first at least one catchment domain including one or more parts of a roadway network and a management domain including one or more parts of the roadway network with the real or virtual DMS or the real or virtual ADMS;
   c. identifying keywords present in the message;
   d. analyzing the message by message components using the keywords or other techniques;
   e. classifying the message components by informational event categories;
   f. identifying roadway links for which the message applies using the keywords and a link identifier table;
   g. identifying the management domain in which the links are located;
   h. identifying a second at least one catchment domain associated with the management domain;
   i. searching a plurality of databases for additional message components for each of the informational event categories;
   j. generating analyzed database data corresponding to the additional message components;
   k. generating inferred enhanced messages as appropriate based on the analyzed database data; and
   l. transmitting the inferred enhanced messages to vehicles.

10. The method of claim 9, further comprising assigning a priority level to each of the inferred enhanced messages.

11. The method of claim 10, wherein the step of transmitting the inferred enhanced messages to vehicles is based on the informational event categories and the priority level.

12. The method of claim 10, further comprising providing a geographical data structure that correlates the real or virtual DMS or the real or virtual ADMS to the management domain and to the first at least one catchment domain.

13. The method of claim 9, further comprising processing inferred enhanced messages to generate corresponding processed inferred enhanced messages for presentation in the vehicles.

14. The method of claim 9, wherein the step of generating inferred enhanced messages is performed at a processing center.

15. The method of claim 9, further comprising limiting a size of the inferred enhanced messages to be displayed in the vehicles.

16. A method for providing traffic information messages, comprising:
   a. receiving at an ETSIMS management center at a physical location or in a cloud at least one message displayed on a DMS or an ADMS, said at least one message originating from a traffic management center (TMC), a regional traffic information management center or a traffic information service;
   b. associating a first at least one catchment domain including one or more parts of a roadway network and a management domain including one or more parts of the roadway network containing the physical location of the DMS or the ADMS; and
   c. communicating the at least one message to vehicles.

17. An Enhanced Traffic Sign Information Messaging System, comprising:
   a. an interface for receiving at an ETSIMS management center at a physical location or in a cloud at least one message displayed on a DMS or an ADMS, said at least one message originating from a traffic management center (TMC), a regional traffic information management center or a traffic information service;
   b. a processor coupled to the interface, wherein the processor receives the at least one message through the interface, associates a first at least one catchment domain including one or more parts of a roadway network and a management domain including one or more parts of the roadway network containing the physical location of the DMS or the ADMS, and transmits the at least one message to one or more vehicles.

18. The Enhanced Traffic Sign Information Messaging System of claim 17, wherein the processor processes the at least one message using one or more processing module, selected from the group consisting of prioritizing the at least one message, identifying keywords present in the at least one message, analyzing the at least one message by message components using keywords or other techniques, classifying the at least one message or the components by informational event categories, identifying roadway links for which the at least one message applies using the keywords and a link identifier table, identifying the management domain in which the links are located, identifying a second at least one catchment domain associated with the management domain, searching a plurality of databases for additional message components for each of the informational event categories, generating analyzed database data corresponding to the additional message components, and generating inferred enhanced messages based on the analyzed database data, said one or more processing module operatively coupled to the processor for developing enhanced traffic messages.

* * * * *